United States Patent
Song et al.

(10) Patent No.: US 6,833,888 B2
(45) Date of Patent: Dec. 21, 2004

(54) LIQUID CRYSTAL DISPLAY DEVICE INCLUDING SUB-PIXELS CORRESPONDING TO RED, GREEN, BLUE AND WHITE COLOR FILTERS

(75) Inventors: In-Duk Song, Kumi-shi (KR); In-Jae Chung, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 82 days.

(21) Appl. No.: 09/784,093

(22) Filed: Feb. 16, 2001

(65) Prior Publication Data

US 2001/0019382 A1 Sep. 6, 2001

(30) Foreign Application Priority Data

Feb. 18, 2000 (KR) .......................................... 2000-7715

(51) Int. Cl.[7] ..................... G02F 1/1335; G02F 1/1343; G02F 1/1345
(52) U.S. Cl. ....................... 349/106; 349/108; 349/144; 349/149
(58) Field of Search ................................ 349/106, 108, 349/144, 149, 150; 345/87, 88, 100

(56) References Cited

U.S. PATENT DOCUMENTS

| | | | | |
|---|---|---|---|---|
| 5,142,392 A | * | 8/1992 | Ueki et al. .................. | 349/111 |
| 5,144,288 A | * | 9/1992 | Hamada et al. ............. | 349/109 |
| 5,157,527 A | * | 10/1992 | De Keyzer et al. ......... | 349/106 |
| 5,526,014 A | * | 6/1996 | Shiba et al. .................. | 345/96 |
| 5,530,570 A | * | 6/1996 | Terumoto .................... | 349/106 |
| 5,936,698 A | * | 8/1999 | Koyama ...................... | 349/187 |
| 5,940,059 A | * | 8/1999 | Lee et al. ..................... | 345/91 |
| 6,256,079 B1 | * | 7/2001 | Matsushima ................ | 349/106 |
| 6,259,504 B1 | * | 7/2001 | Shin et al. ................... | 349/144 |
| 6,335,777 B1 | * | 1/2002 | Yokoyama et al. ......... | 349/133 |
| 2001/0019376 A1 | * | 9/2001 | Kim ............................. | 349/43 |

FOREIGN PATENT DOCUMENTS

| | | | |
|---|---|---|---|
| JP | 61-239220 | * | 10/1986 |
| JP | 62-91917 | * | 4/1987 |

* cited by examiner

*Primary Examiner*—Tarifur R. Chowdhury
(74) *Attorney, Agent, or Firm*—McKenna Long & Aldridge LLP

(57) ABSTRACT

A liquid crystal display device has stripe-shaped color filters and arranges the driver ICs on the top or the bottom side portion, and on the left or right side portion of the liquid crystal panel such that the liquid crystal display device has a single bank structure. Accordingly, a difference of a signal delay between the adjacent two odd and even data or gate lines is prevented. As a result, the brightness and the resolution are improved.

12 Claims, 5 Drawing Sheets

LIQUID CRYSTAL DISPLAY DEVICE INCLUDING SUB-PIXELS CORRESPONDING TO RED, GREEN, BLUE AND WHITE COLOR FILTERS

This application claims the benefit of Korean Patent Application No. 2000-7715, filed on Feb. 18, 2000, which is hereby incorporated by reference for all purposes as if fully set forth herein.

BACKGROUND OF THE INVENTION

1. Field of the Invention

The present invention relates to a liquid crystal display (LCD) device, and more particularly, to a LCD device having color filters arranged in a stripe shape.

2. Discussion of the Related Art

In general, the LCD device includes a liquid crystal panel having upper and lower substrates and an interposed liquid crystal layer. The upper substrate, referred to as a color filter substrate, includes a common electrode and color filters. The lower substrate is called an array substrate and includes gate lines arranged in a transverse direction and data lines arranged in a longitudinal direction perpendicular to the gate lines. A pixel electrode is formed on a region of the lower substrate defined by the gate and data lines. Thin film transistors (TFTs) are formed as switching elements at a crossing point of the gate and data lines in a matrix. Each of the TFTs includes a gate electrode, a source electrode and a drain electrode. The drain electrode contacts the pixel electrode via a drain contact hole. Peripheral portions of the two substrates are sealed by a sealant to prevent liquid crystal leakage. The gate lines serve to transmit scanning signals to the gate electrodes, and the data lines serve to transmit data signals to the source electrodes. The data signals change alignments of the liquid crystal molecules according to the scanning signals such that the LCD device displays various gray levels.

In such an LCD device, a driver integrated circuit (IC) that applies signals to each electrode through each line on the lower substrate may be mounted using various methods, for example, chip on board (COB), chip on glass (COG), tape carrier package (TCP), and the like.

The COB method is conventionally adopted for a segment type LCD device, or a LCD panel having a low resolution. Since the segment type LCD device or the low resolution LCD panel uses a small number of leads, the driver IC thereof has also a small number of leads. Therefore, the driver IC thereof is first installed on a printed circuit board (PCB) having a plurality of leads, and the leads of the PCB are connected with the LCD panel via a proper method, which is relatively simple.

However, as the LCD devices have high resolutions, a great number of leads are adopted for the driver IC. When the driver IC has a great number of leads, it is difficult to install the driver IC on the above-mentioned PCB.

In another method, the COG method, the driver IC is directly installed on the LCD panel without interposing the PCB. Therefore, the connection between the driver IC and the LCD panel is stable, and a minute pitch is applicable for the installation of the driver IC. The COG method employs a multi-layered flexible printed circuit board (FPCB) instead of the PCB. The multi-layered FPCB contacts the LCD panel via an anisotropic conductive film (ACF) and transmits input signals to the driver IC.

The above-mentioned COG method has advantages of low cost and high stability. However, since a pad of the LCD panel needs an additional area to install the driver IC, the LCD panel should be enlarged. In addition, when the COG method is adopted for the LCD panel, it is difficult to repair defects of the driver IC or terminal lines of the LCD panel.

In another method, the TCP method, the driver IC is installed on a polymer film. The TCP method is widely used for LCD devices as well as mobile phones that need small, thin, and light electrical packages.

FIG. 1 is a cross-sectional view illustrating a liquid crystal panel having a driver IC mounted thereon using the TCP technique. As shown in FIG. 1, a driver IC 17 is mounted on a polymer film 19, and the polymer film 19 having the driver IC 17 is connected with both a lower substrate 11 and a printed circuit board 15 through an anisotropic conductive film (ACF) 18. Signals are applied through such a tape carrier package from one or each end portion of gate and data lines (not shown) in order to drive the liquid crystal panel having the lower and upper substrates 11 and 13.

FIG. 3 is a plan view illustrating a conventional quad type color LCD device. A liquid crystal panel 111 generally includes a number of dots, and each unit pixel includes four sub-pixels or dots: an RGBW (red, green, blue, and white) arrangement as shown in FIG. 3 or an RGGB (red, green, green, and blue) arrangement (not shown).

In a large-sized LCD device employing the TFT as a switching element, when a direct current bias is applied to the liquid crystal layer, the liquid crystal layer can deteriorate. Thus, it is preferable to change a polarity of a voltage applied to the liquid crystal layer for each frame. Such inversion driving methods are classified into frame inversion, column inversion, line inversion, and dot inversion.

FIGS. 2A to 2D are plan views illustrating the four inversion methods mentioned above. In the frame inversion driving method, as shown in FIG. 2A, all of the sub-pixels receive signals of the same polarity in one frame and in next frame all of the sub-pixels receive signals of inverse polarity. FIG. 2B illustrates the column inversion driving method, that sub-pixels of every other column receive the signals of the same polarity and the polarity of the signal is changed at the next frame. FIG. 2C illustrates the line inversion driving method, that sub-pixels of every other line (row direction) receive the signals of the same polarity and the polarity of the signal is changed at the next frame. FIG. 2D illustrates the dot inversion driving method. In the dot inversion drive method, the drive voltages applied to the pixel electrodes are such that the polarities of two adjacent pixel electrodes, which are disposed adjacent to each other in either the column or row direction, are opposite to each other with respect to the counter electrode. In other words, the polarities of the pixel electrodes with respect to the counter electrodes alternate as viewed along both the column direction and the row direction in each instance.

Through such inversion methods, cross talk and flickering of a screen can be reduced and a large-sized color LCD device is driven using such a method.

In order to drive the LCD device, gate driver ICs and data driver ICs, which are respectively connected with data lines and gate lines, are mounted to the liquid crystal panel through various method described above. Further, the LCD device employs either a dual bank structure or a single bank structure to drive the liquid crystal layer. In the dual bank structure, the data driver ICs are arranged on both top and bottom side portions of the liquid crystal panel, or the gate driver ICs are arranged on both right and left side portions of the liquid crystal panel. In the single bank structure, the data driver ICs are all arranged on either the top or the bottom portion of the liquid crystal panel, or the gate driver ICs are all arranged on either the right or left portion of the liquid crystal panel.

As shown in FIG. 3, the liquid crystal panel 111 adopts the dual bank structure that has a plurality of the driver ICs at all four sides of the liquid crystal panel. Namely, the data driver ICs 115a and 115b that apply the data signals to the data lines 119 are arranged on both top and bottom portion of the liquid crystal panel 111, and the gate driver ICs 113a and 113b that apply the scanning signals to the gate lines 117 are arranged on both left and right side portions of the liquid crystal panel 111. For a more detailed explanation, the two gate driver ICs 113a are arranged on a left side portion of the liquid crystal panel 111, and two gate driver ICs 113b are arranged on a right side portion of the liquid crystal panel 111 in the dual bank structure. Also, the four data driver ICs 115a are arranged in the top portion of the liquid crystal panel 111, and the four data driver ICs 115b are arranged in the bottom portion of the liquid crystal display panel 111 in the dual bank structure. The liquid crystal display panel 111 can employ the dot inversion driving method or the frame inversion driving method which are described above. An external controller controls such driving methods.

At this time, according to the dual bank structure, each of the gate driver ICs 113a and 113b formed respectively on left and right sides portion of the liquid crystal panel 111 operate the even or odd numbered gate lines, respectively. Moreover, each of the data driver ICs 115a and 115b formed respectively on top and bottom side portions of the liquid crystal panel 111 operate the even or odd numbered data lines, respectively. For that reason, a signal difference is created between adjacent lines.

FIG. 4 is a plan view illustrating data signal transmissions of the liquid crystal panel having a dual bank structure according to a conventional art. As shown in FIG. 4, the data driver ICs 115a are arranged at the top side portion of the liquid crystal panel 111 to drive odd numbered data line 121, and the data driver ICs 115b are arranged at the bottom side portion of the liquid crystal panel to drive even numbered data line 123. Therefore, a difference of a signal delay caused by a line resistance may occur between the odd and even numbered data lines. For example, a difference of a signal delay between the two adjacent odd and even data lines may occur at portions A and A'. As a result, optical characteristics of the pixel may vary, whereby defects causing a brightness difference may occur at the portions A and A'.

SUMMARY OF THE INVENTION

Accordingly, the present invention is directed to a liquid crystal display device having stripe-shaped color filters that substantially obviates one or more of the problems due to limitations and disadvantages of the related art.

To overcome the problems described above, a preferred embodiment of the present invention provides a liquid crystal display device which arranges color filters in a stripe shape.

Another object of the present invention is to provide the liquid crystal display device having a high brightness and resolution.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve the above object, the preferred embodiments of the present invention provide a liquid crystal display device, including: a liquid crystal panel having a plurality of gate and data lines and a plurality of sub-pixels, wherein the gate lines are arranged in a transverse direction and the data lines are arranged in a longitudinal direction, wherein each sub-pixel is defined by the gate and data lines and corresponds to a stripe-shaped color filter that has one of red, green, blue and white colors; a black matrix arranged among the stripe-shaped color filters; a gate driver integrated circuit (IC) connected to the plural gate lines for driving the gate lines, the gate driver IC arranged on one side portion of the liquid crystal panel; and a data driver integrated circuit (IC) connected to the plural data lines for driving the data lines, the data driver IC arranged on one side portion of the liquid crystal panel.

Each stripe-shaped color filter can have one of red, green, green and blue colors. The stripe-shaped color filter having a white color is made of a transparent resin, or the stripe-shaped color filter having a white color is a open portion of the black matrix.

The principles of the present invention further provide a method of fabricating a liquid crystal display device, beneficially including: forming a plurality of gate and data lines on a first substrate; forming a black matrix on a second substrate; forming open portions for color filters by patterning the black matrix; depositing a resin on the black matrix covering the open portions, wherein the resin has one of red, green, blue and white colors; forming color filters in the open portions by photolithography, the color filters having a stripe shape; forming a liquid crystal panel by combining the first and second substrates with interposed liquid crystal; installing data driver integrated circuits (ICs) on a top or bottom side portion of the liquid crystal panel, wherein the data driver ICs drive the plural data lines; and installing gate driver integrated circuits (ICs) on one side portion of the liquid crystal panel, wherein the gate driver ICs drive the plural gate lines.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment, an example of which is illustrated in the accompanying drawings.

Figures 1, 2A, 2B, 2C, 2D:
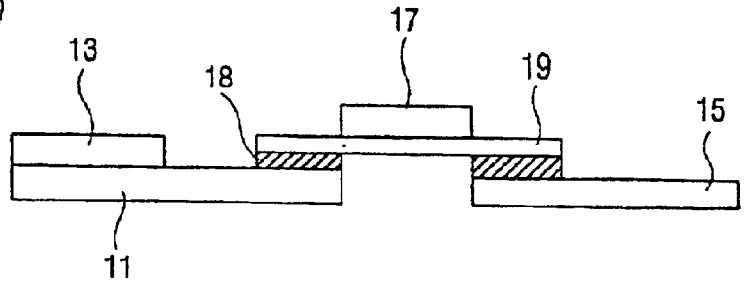
FIG. 1 is a cross-sectional view illustrating a typical liquid crystal panel mounting a driver IC using the TCP technique.
FIGS. 2A to 2D are plan views illustrating, respectively, a frame inversion driving method, a column inversion driving method, a line inversion driving method, and a dot inversion driving method.
Figure 3:
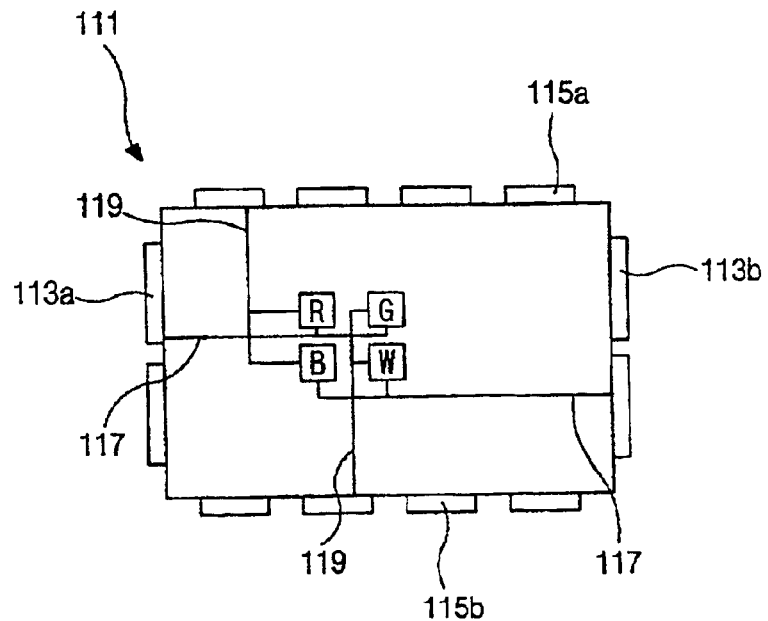
FIG. 3 is a plan view illustrating a quad type liquid crystal display device according to a conventional art.
Figure 4:
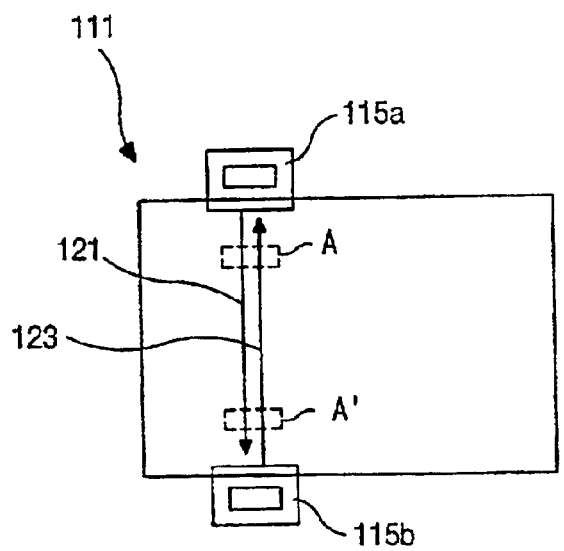
FIG. 4 is a plan view illustrating a configuration of a liquid crystal panel having a dual bank structure according to a conventional art.
Figure 5:
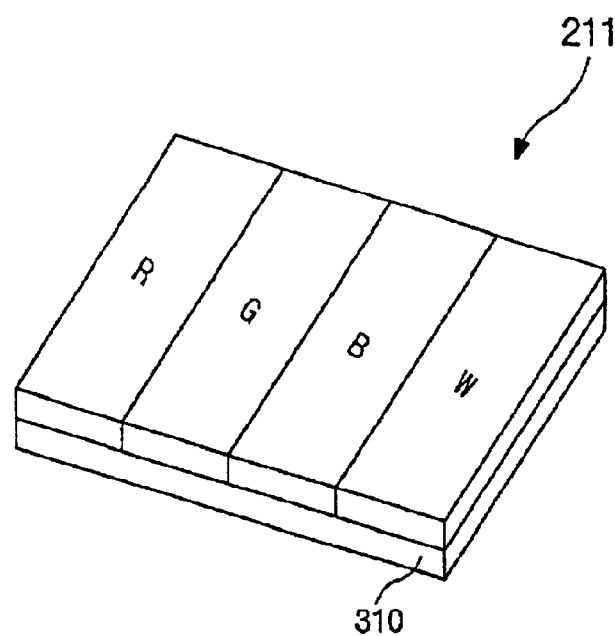
FIG. 5 is a schematic perspective view illustrating an arrangement of color filters in a stripe shape according to a preferred embodiment.

FIG. 5 is a schematic perspective view illustrating an arrangement of color filters in a stripe shape according to a preferred embodiment. As shown, the color filters 211 are formed on a substrate 310 and are arranged in a stripe shape. Each color filter has a red, green, blue or white color.

Figure 6A:
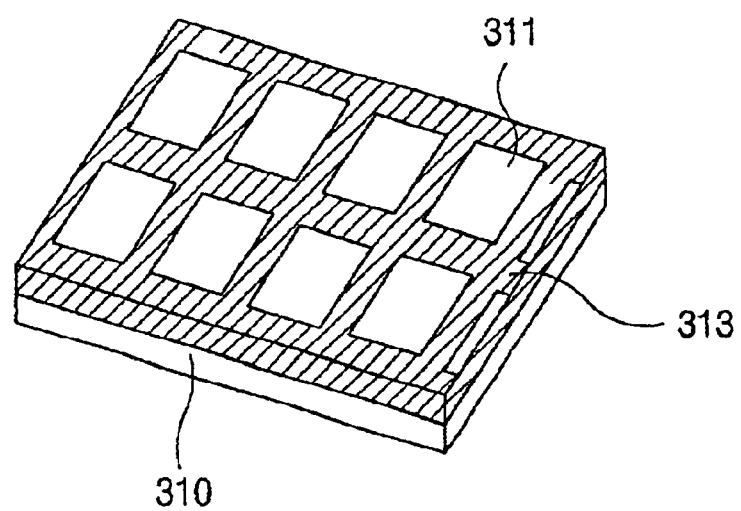
FIGS. 6A and 6B are plan views illustrating fabrication steps of stripe-shaped color filters according to the preferred embodiment.
Figure 6B:
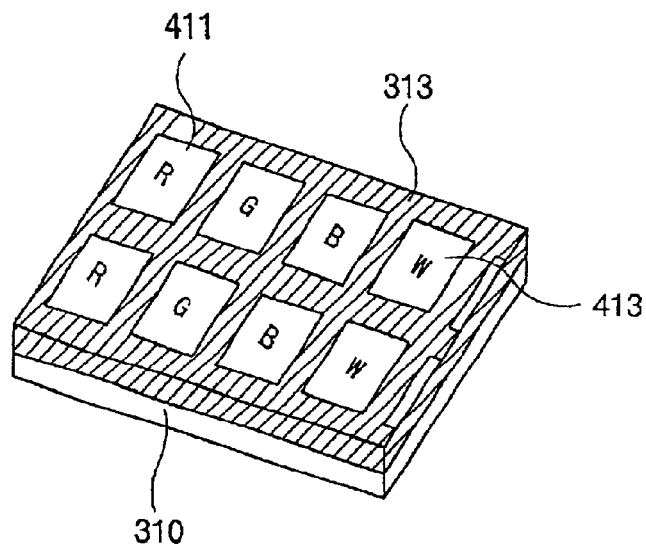

FIGS. 6A and 6B are plan views illustrating fabrication steps of stripe-shaped color filters according to the preferred embodiment.

Referring to FIG. 6A, chrome oxide ($CrO_x$) and chrome (Cr) are deposited in series on the substrate 310. These materials finally form a black matrix 313. The open portions 311 for the color filters are formed by patterning the black matrix 313 using a photolithography process. Thus, the black matrix 313 is arranged among the open portions 311 and prevents the light from leaking, and thus the black matrix 313 raises the contrast ratio of the liquid crystal display. The black matrix 313 is usually made of chrome (Cr), but it can be made of an organic substance.

Referring to FIG. 6B, a resin having reddish colored pigment is deposited on the black matrix 313 and in the open portions 311 (see FIG. 6A). After that, color resist is formed on the open portions 311, and the red color filters 411 are then formed by patterning the resin using the photolithography process. Through repeating these processes, the green and blue color filters are formed and thus the RGBW (red, green, blue and white) color filters having a stripe shape is complete.

When forming the white color filters 413, the open portions 311 are used "as-is." Namely, the open portions 311 without any resin are used as the white color filters 413. Alternatively, transparent resin can also be used as the white color filters 413.

Accordingly, the color filter substrate fabricated according to the above-mentioned method is adhered to the array substrate having the switching elements and the plural lines. The liquid crystal is interposed between the pair of substrates, and thus the liquid crystal panel is completed. After that, the data driver ICs and the gate driver ICs are installed between that liquid crystal panel and the PCB via a proper method. Thus, the LCD device is complete.

Figure 7:
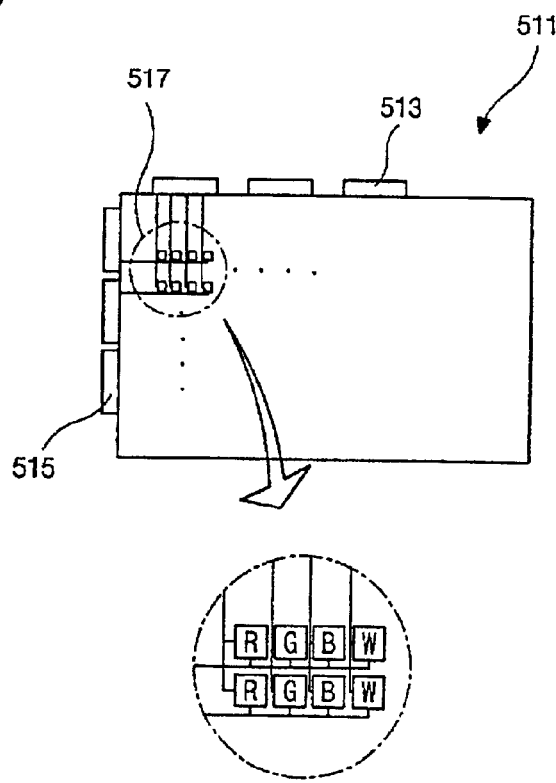
FIG. 7 is a schematic plan view illustrating configuration of the liquid crystal display device having stripe-shaped color filters according to the preferred embodiment.
Figure 8:
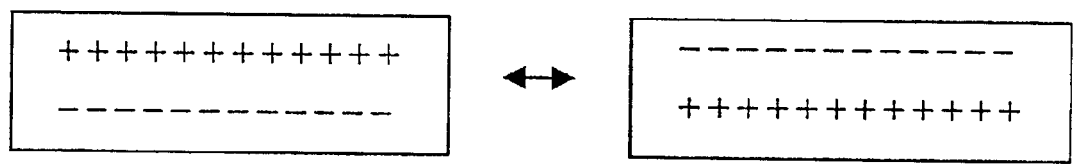
FIG. 8 illustrates line inversion driving in accordance with the preferred embodiment.

FIG. 7 is a schematic plan view illustrating configuration of the liquid crystal display device having stripe-shaped color filters according to the preferred embodiment. As shown, in the liquid crystal display device 511, the data driver ICs 513 can be arranged on either the top or bottom side portions of the liquid crystal panel, and the gate driver ICs 515 can also be arranged on either the right or left side portions. At this point, positive (+) polarity signals are applied to the sub-pixels that are connected with the odd numbered gate lines contacting the gate driver ICs 515. And the negative (−) polarity signals are applied to the sub-pixels that are connected with the even numbered gate lines. Thus, each sub-pixel of the liquid crystal panel is operated by these signals. And thus, the line inversion driving method according to the embodiment is as shown in FIG. 8.

As described above, since the embodiment has the RGBW (red, green, blue and white) or RGGB (red, green, green, and blue) color filters in a stripe shape, the liquid crystal panel is operable in the single bank type. Thus, a difference of a signal delay between the two adjacent odd and even data or gate lines is prevented. As a result, the brightness and the resolution of the liquid crystal display are improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    a liquid crystal panel having a plurality of gate and data lines and a plurality of sub-pixels, wherein the gate lines are arranged in a transverse direction and the data lines are arranged in a longitudinal direction, wherein sub-pixels are defined by the gate and data lines and correspond to red, green, blue and white color filters, respectively, wherein the color filters along the same data line have the same color, wherein adjacent ones of color filters along the same gate line have different colors, wherein the red, green, blue and white color filters constitute one pixel, and wherein a black matrix is arranged between each color filter;
    a gate driver integrated circuit (IC) connected to the plurality of gate lines for driving the gate lines, the gate driver IC arranged on a first side portion of the liquid crystal panel; and
    a data driver integrated circuit (IC) connected to the plurality of data lines for driving the data lines, the data driver IC arranged on a second side portion of the liquid crystal panel.

2. The device according to claim 1, wherein a stripe-shaped color filter having a white color is made of a transparent resin.

3. The device according to claim 1, wherein a stripe-shaped color filter having a white color is an open portion of the black matrix.

4. The device according to claim 1, wherein a polarity of signals applied to sub-pixels defined by adjacent gate lines is alternated at each frame interval.

5. The device according to claim 1, wherein polarities of signals applied to sub-pixels defined by adjacent gate lines is alternated during a same frame interval.

6. The device according to claim 1, wherein the data driver IC drives adjacent odd and even numbered data lines.

7. A liquid crystal display device, comprising:
    a liquid crystal panel, comprising,
        a first substrate having deposited thereon a plurality of color filters and a black matrix arranged between each of the color filters, wherein the color filters have red, green, blue and white colors, respectively, and wherein the red, green, blue and white color filters constitute one pixel;
        a second substrate disposed opposing the first substrate and having a plurality of gate lines arranged in a transverse direction, a plurality of data lines arranged in a longitudinal direction, and a plurality of sub-pixels each formed at a crossing of one of the gate lines and data lines, and a liquid crystal material deposited between the first and second substrates, wherein each sub-pixel corresponds to one of the color filters, wherein color filters along the same data line have the same color, and wherein adjacent ones of color filters along the same gate line have different colors;

at least one gate driver integrated circuit (IC) connected to the gate lines for driving the gate lines, each gate driver IC disposed on a same side portion of the liquid crystal panel; and at least one data driver integrated circuit (IC) connected to the data lines for driving the data lines, each data driver IC arranged on a same one of a top side portion and a bottom side portion of the liquid crystal panel.

8. The liquid crystal display device of claim 7, further comprising at least one tape carrier package connecting the at least one data driver IC to the liquid crystal panel.

9. The liquid crystal display device of claim 7, wherein each data driver IC drives adjacent odd and even numbered data lines.

10. The liquid crystal display device of claim 7, wherein each data line is connected to a plurality of sub-pixels each corresponding to one of the color filters having a same color.

11. The liquid crystal display device of claim 7, wherein a polarity of signals applied to sub-pixels defined by adjacent gate lines is alternated at each frame interval.

12. The liquid crystal display device of claim 7, wherein polarities of signals applied to sub-pixels defined by adjacent gate lines is alternated during a same frame interval.

* * * * *